(12) United States Patent
Hassan et al.

(10) Patent No.: US 7,037,579 B2
(45) Date of Patent: May 2, 2006

(54) POLYMER COMPOSITE FIBROUS COATING ON DIPPED RUBBER ARTICLES AND METHOD

(75) Inventors: Noorman Bin Abu Hassan, Shah Alam (MY); David Mark Lucas, Petaling Jaya (MY); Nuzaimah Binti Mustafa, Melaka (MY)

(73) Assignee: Ansell Healthcare Products LLC, Red Bank, NJ (US)

( * ) Notice: Subject to any disclaimer, the term of this patent is extended or adjusted under 35 U.S.C. 154(b) by 0 days.

(21) Appl. No.: 10/741,413

(22) Filed: Dec. 19, 2003

(65) Prior Publication Data

US 2005/0136236 A1    Jun. 23, 2005

(51) Int. Cl.
    *B32B 25/02* (2006.01)
(52) U.S. Cl. .............................. 428/295.1; 428/297.1; 428/300.7; 428/319.3; 428/304.4
(58) Field of Classification Search ............. 428/297.1, 428/295.1, 300.7, 319.3, 304.4
    See application file for complete search history.

(56) References Cited

U.S. PATENT DOCUMENTS

| | | |
|---|---|---|
| 3,098,755 A | 7/1963 | Barth et al. |
| 5,036,551 A | 8/1991 | Dailey et al. |
| 5,486,322 A | 1/1996 | Fuchs |
| 5,540,976 A | 7/1996 | Shawver et al. |
| 5,742,943 A | 4/1998 | Chen |
| 5,877,244 A * | 3/1999 | Hoover et al. .............. 524/322 |
| 5,997,969 A * | 12/1999 | Gardon ...................... 428/35.7 |
| 6,019,922 A * | 2/2000 | Hassan et al. .............. 264/130 |
| 6,021,524 A * | 2/2000 | Wu et al. ...................... 2/167 |
| 6,028,017 A | 2/2000 | Curtin et al. |
| 6,096,668 A | 8/2000 | Abuto et al. |
| 6,143,416 A | 11/2000 | Brindle et al. |
| 2002/0066975 A1 | 6/2002 | Elvig |

FOREIGN PATENT DOCUMENTS

| | | |
|---|---|---|
| GB | 1091523 | 11/1967 |
| GB | 1102342 A | 2/1968 |

* cited by examiner

*Primary Examiner*—Melanie Bissett
(74) *Attorney, Agent, or Firm*—Glen M. Diehl; Diehl Servilla LLC

(57) ABSTRACT

The present invention provides a method of making an elastomeric article including preparing a non-woven fibrous polymer composition for dip-coating onto a layer of carboxylated acrylonitrile-butadiene elastomeric surface and in particular making industrial or household gloves. By dipping a former into a salt-based coagulant, followed by dipping into an elastomeric dispersion, and finally dipping into a polymer composite fibrous coating, a useful elastomeric article is prepared. The invention also provides an elastomeric article having a first layer, the first layer comprising a natural or synthetic polymer; and a second layer bonded to the first layer, the second layer comprising a polymer composite fibrous coating. The polymer composite fibrous coating includes at least one elastomer or elastomer blend, a fiber or fiber blend, a surfactant, and a micronised wax. The coating can be foamed, and provides improved sweat management and non-shredding properties to a user.

10 Claims, 2 Drawing Sheets

POLYMER COMPOSITE FIBROUS COATING ON DIPPED RUBBER ARTICLES AND METHOD

FIELD OF THE INVENTION

The invention relates to an elastomeric article having a polymer composite fibrous coating including an elastomer or elastomer blend, a fiber or fiber blend, a surfactant, and a micronised lubricant wax. This invention also relates to a method of making a thin lining of non-woven fabric-polymer composite coating bonded onto rubber articles. The polymer composite fibrous coating can be foamed. The thin lining or foamed lining can be applied to gloves used in household or industrial applications.

BACKGROUND OF THE INVENTION

A common method of coating household or industrial gloves is by flocking, or blowing natural cotton or synthetic fibers by using air or static discharge, onto a thickened dipped adhesive layer of polymer latex bonded onto a first layer of another polymer latex gel. Other methods include mounting former-shaped woven fabric onto metal or ceramic formers and dipping polymer latex onto the woven-fabric layer.

For example, U.S. Pat. No. 3,098,755 claims a method of producing adherent polyurethane coatings on latex rubber substrates. A flock layer is deposited on the polyurethane coating prior to curing by any suitable method, such as mechanically or electrostatically. The flock is impinged onto the coating in such a way that mixing of the flock fibers with the polymer or embedding of the fibers or full penetration thereof into the polymer coating is avoided. Thus, while the fibers may be oriented normal to the coating surface, or oriented in a different fashion, the fibers are engaged only by the surface portion of the coating.

A modification of the flocking technique is described in GB 1,102,342, which includes a non-dipping process for manufacture of elongated binder particles of polymeric materials. The process is performed by adding natural or synthetic fibers into a dispersion of polymeric materials, freezing the aqueous dispersion of the polymeric material, and thawing the frozen dispersion to obtain particles of the polymeric material. The particles of polymeric material then bind the natural or synthetic fibers together against a porous surface when suction is applied. The porous surface is a paper-making screen and the fibrous web formed is then pressed and calendered.

U.S. Pat. No. 6,143,416 discloses a method of forming a thin-walled article, namely a surgical glove. The glove includes a first elastomer layer of polyurethane formed by dip-coating using a rough-surfaced former to provide outer surface grip for the glove.

GB 1,091,523 discloses a method of making a composite flock-coated mat. The steps of the method include: coating the surface of a flexible base sheet with a curable natural or synthetic rubber latex adhesive, electrostatically depositing flock on the adhesive, drying the adhesive, placing the flock-coated section on an electrically-heated vacuum mold and applying vacuum so that the section is drawn into position, curing the base sheet and adhesive, and attaching molded mats comprising a natural or synthetic composition to the flock-coated section.

It is common for a wearer of industrial or household gloves to experience excessive sweat soaking. Thus, industrial or household gloves are less comfortable when worn for longer periods of time. Current unflocked and flock-lined gloves in the market fall into these categories. Although flock-lined gloves provide better surface comfort than unflocked gloves, the sweat absorption by and evaporation from this type of glove is still relatively poor. Additionally, flock coverage is sometimes inconsistent in conventional flock linings.

Accordingly, it is desirable to have a fibrous polymer coated surface that cools through evaporation, is able to absorb and hold moisture as it evaporates from this surface, and cools the wearer while keeping the wearer dry. Therefore, a method is needed for producing gloves of the sort used in household or industrial applications for increased comfort with respect to improved sweat management to the user.

SUMMARY OF THE INVENTION

In one embodiment, a polymer composite fibrous coating is applied through a dipping process onto a salt coagulant primer-coated or an elastomeric natural or synthetic polymer gelled surface prior to curing. After curing and drying the polymer layer and also the polymeric fibrous composite coating, the coating is bonded to the polymer layer.

In another embodiment of the present invention there is provided a method of preparing a non-woven fibrous polymer composition mixture for dip-coating onto a layer of carboxylated acrylonitrile-butadiene elastomeric surface. A hand-shaped former is first dipped into a salt-based coagulant. The coagulant-coated former is then dipped into an elastomeric dispersion and finally dipped into a fibrous polymer composite coating. This method is particularly useful in making elastomeric articles such as industrial or household gloves. The method can include the steps of: dipping a hand-shaped preheated former into a coagulant salt solution; drying the coagulant; dipping into an elastomeric dispersion; drying the gelled elastomer; dipping into a novel composition of a polymer composite fibrous coating, which is a surfactant-stabilized composite dispersion of a polymer solution such as polyurethane, mixed with fibrous materials such as cotton and rayon in combination with a micronised high density polyethylene; forming a fibrous gelled structure with the application of residual coagulant salt from gelation of the elastomeric layer or additional salt coagulant priming before the composite coating; and drying and curing the polymer composite fibrous coating and elastomeric layer.

In another embodiment there is provided an elastomeric article having a first layer, the first layer comprising a natural or synthetic polymer; and a second layer bonded to the first layer, the second layer comprising a polymer composite fibrous coating. The polymer composite fibrous coating includes at least one elastomer or elastomer blend, a fiber or fiber blend, a surfactant, and a micronised wax.

DETAILED DESCRIPTION OF THE INVENTION

In one aspect of the present invention there is provided a non-shedding or non-linting coating, suitable for use in applications such as food processing, where fiber shedding and product contamination are unacceptable. Sweat management in articles worn next to human skin is also an important factor. Such properties are important in the market. In another aspect there is provided an elastomeric article such as a glove with improved sweat management properties and non-shedding fibrous linings.

Figure 1:
FIG. 1 is a scanning electron photomicrograph of a perspective view of a polymer composite fibrous coating bonded to an elastomer layer in one embodiment of the present invention.
Figure 2:
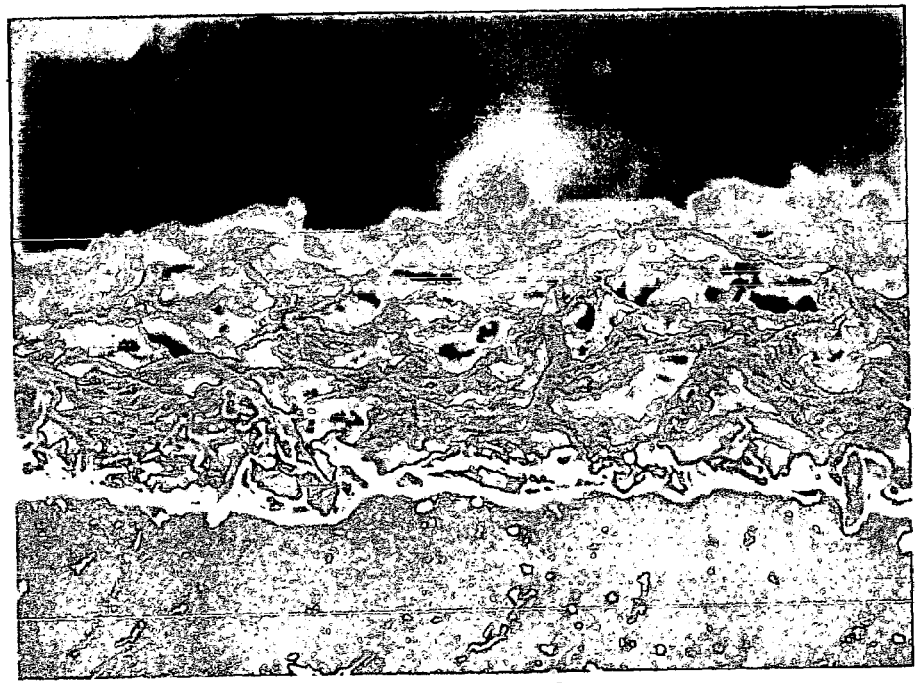
FIG. 2 is a scanning electron photomicrograph of a side view of the polymer composite fibrous coating bonded to an elastomer layer of FIG. 1.
Figure 3:
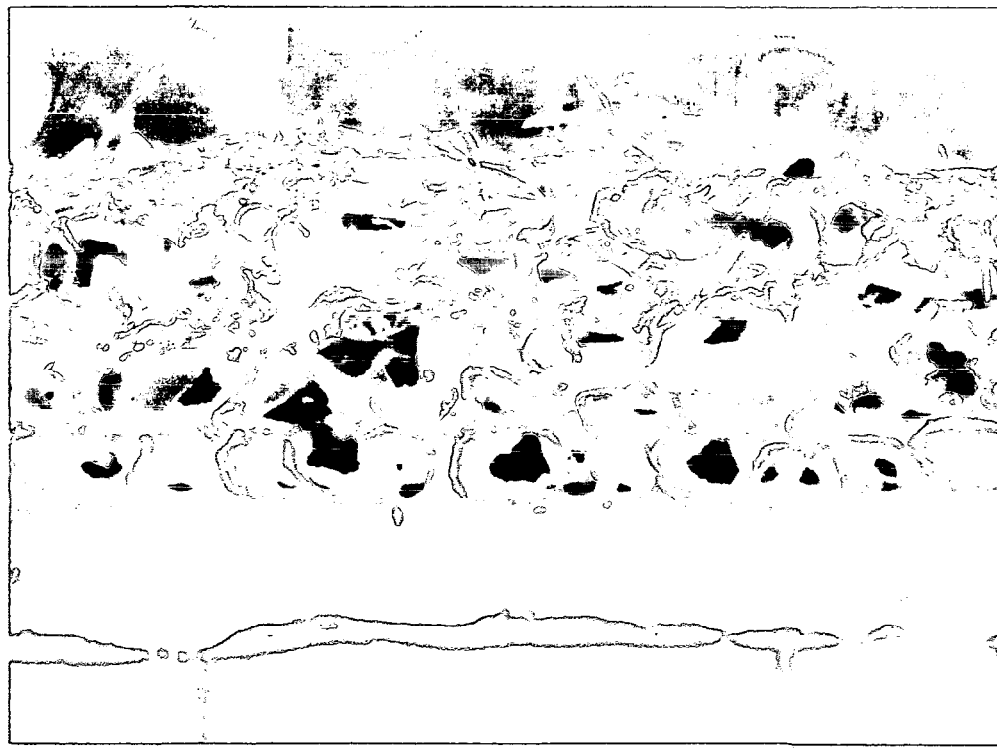
FIG. 3 is a scanning electron photomicrograph of a side view of a foamed polymer composite fibrous coating bonded to an elastomer layer in another embodiment of the present invention.
Figure 4:
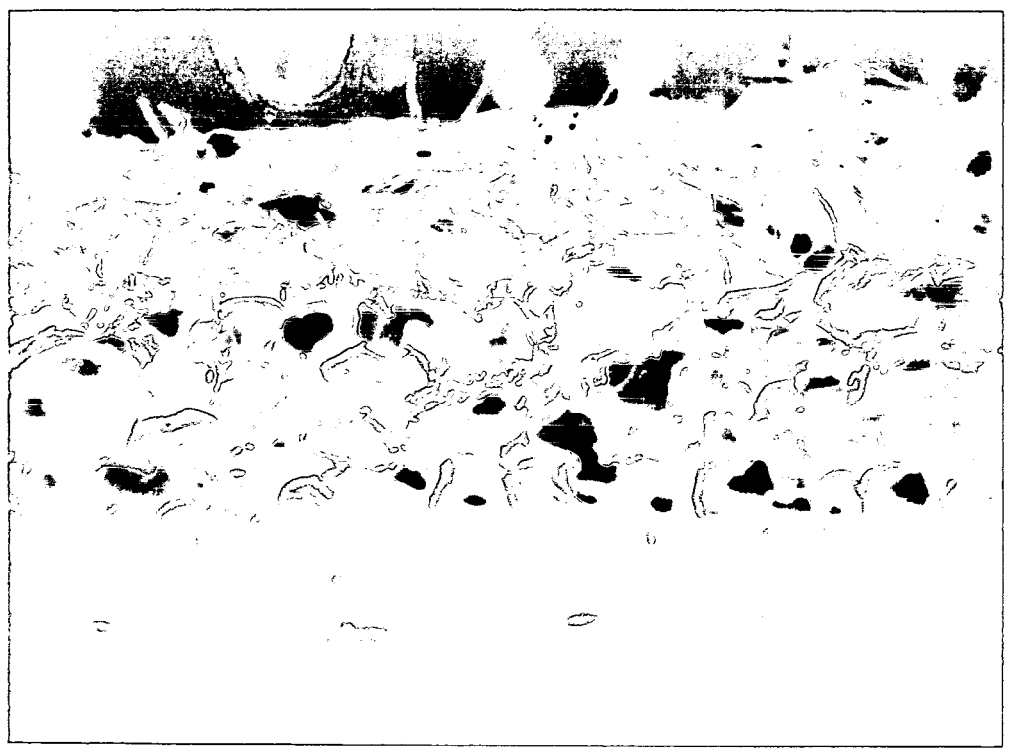
FIG. 4 is another scanning electron photomicrograph of the embodiment of FIG. 3.

In one embodiment there is provided a method for making a dipped elastomeric article including the steps of dipping a heated hand-shaped former into a salt coagulant, drying the coagulant, and dipping the former into a synthetic or natural latex dispersion. The gelled layer of synthetic or natural elastomer is then dipped into a coagulant salt primer, then the primer is dried before dipping into a bath of a fibrous polymer composite solution or a fibrous polymer composite foamed dispersion. Alternatively, the gelled elastomeric layer can be dipped directly into the fibrous composite solution or fibrous composite foamed dispersion without any primer dip if a thin layer of fibrous polymer film or a fibrous foamed layer is required. The polymer composite fibrous coating laminate or polymer composite fibrous foamed laminate on the glove will provide adequate comfort to the user when used for prolonged periods. A set of SEM photographs (FIGS. 1–2) shows the polymer composite fibrous coating. Another set of SEM photographs (FIGS. 3–4) shows the construction of the polymer composite fibrous foamed coating laminate.

Another embodiment of the above method can be carried out by dipping a gelled elastomeric layer into a natural or synthetic latex foam bath, drying it, and priming with coagulant salt before dipping into the fibrous composite solution. The foam layer will provide extra cushioning comfort during long periods of use, for example, in a glove.

Alternatively, in another embodiment, the composite mixture of fibrous materials and natural or synthetic polymers can also be foamed-up with suitable foaming agents or foam surfactants to give an open-celled fibrous foam construction laminate on the glove surface. Useful polymers include natural rubber latex, synthetic polyisoprene latex, styrene-butadiene latex, carboxylated or non-carboxylated acrylonitrile-butadiene latex, polychloroprene latex, polyacrylic latex, butyl latex, polyurethane latex, and the like.

One useful aspect in a glove embodiment of the present invention is the ability to control the sweat absorption and drying it up upon perspiration by the glove user during prolonged periods of use. For example, the glove embodiment can include a polymer composite fibrous lining combination of, for example, cotton, rayon, high density polyethylene and an elastomer, preferably polyurethane, thus affording an increased degree of comfort to the user.

Natural or synthetic polymers can be used in the first, base layer of the elastomeric article of the present invention. The polymers include elastomers, such as, but not limited to, natural rubber, synthetic polyisoprene, styrene-butadiene, carboxylated or non-carboxylated acrylonitrile-butadiene, polychloroprene, polyacrylic, butyl rubber, or polyurethane, and the like. The polyurethanes can be polyether- or polyester-based. Commercial elastomer latexes can be used that provide the polymer on curing. Useful commercial elastomer latexes include NEOREZ R-987, PERBUNAN X1171, and the like.

Fibrous materials used in the various embodiments of the polymer fibrous composite of the present invention can be natural or synthetic, such as wool, cotton, jute, rayon, polyamide, polyesters or acrylics. The fibrous material preferably should have a denier ranging from about 1.0 to about 2.0 and a length ranging from about 0.1 mm to about 2.0 mm. The fibers of the present invention can be in the form of cotton flock or rayon flock, for example.

The elastomer used in the various embodiments of the polymer fibrous composite of the present invention can be made of acrylonitrile-butadiene, polychloroprene, polyacrylic, natural rubber, synthetic polyisoprene, butyl rubber, polyurethane, styrene-butadiene, and the like. The polyurethanes can be polyether- or polyester-based. Preferably, the material should be of high moisture vapor transmission such as the polyurethane or synthetic hydrogels. The elastomer of the present invention can be self-cross-linkable, that is, can cross-link to itself, or can be treated with a cross-linking curing agent. Commercial elastomer latexes can be used that provide the elastomer on curing. Useful commercial elastomer latexes include NEOREZ R-987, PERBUNAN X1171, and the like.

In the embodiments of the present invention, the elastomeric polymers and the elastomers can be the same or different. It is important that the elastomeric layers, comprising the polymers and the elastomers, can be bonded to each other upon curing.

Micronised lubricant waxes such as high density polyethylene ("HDPE"), polypropylene, carnauba, hydrocarbon or polytetrafluoroethylene ("PTFE") provide some degree of smoothness and lubricity to the composite lining for ease of donning, especially when the coating is foamed. Micronised waxes can improve flow behavior in aqueous flock dispersions used in the present invention. Waxes useful in the various embodiments of the polymer fibrous composite of the present invention can be of natural or synthetic origin. Synthetic waxes include polymer and copolymer waxes, for example, polyethylene wax, oxidised polyethylene wax, modified polyethylene wax, high density polyethylene wax, oxidised high density polyethylene wax, modified high density polyethylene wax, polypropylene wax, polyamide wax, polytetrafluoroethylene wax, and the like. Useful natural waxes include, for example, carnauba wax, microcrystalline wax, paraffin wax, and the like. One useful micronised HDPE wax is ACUMIST D9 available from Honeywell International, Specialty Wax and Additives, USA.

Surfactants such as nonionic acetylenic diols and ethoxylated acetylenic diols are useful in the various embodiments of the polymer fibrous composite of the present invention. One useful surfactant is SURFYNOL 465 available from Air Products and Chemicals Inc., USA.

Foaming and frothing agents are useful in the various embodiments of the polymer fibrous composite of the present invention. Useful commercial foaming agents include CALSOFT L 60 available from Pilot Chemical Company, USA, and EMULVIN W from Bayer AG, Germany.

Additives, such as thickeners, curatives or curing agents can be used in the various embodiments of the polymer fibrous composite of the present invention. For example, triethanolamine can be used along with the surfactants of the present invention. One useful thickener is ACRYSOL G 111 available from Rohm and Haas (UK) Ltd., United Kingdom. PEG 3350 is available from ICI Australia Operations Pty Ltd. CELLOSIZE is available from Union Carbide (Europe) S.A., Belgium. COMPOSITE A345 is available from Aquaspersion Ltd., United Kingdom. SCRIPSET 550 is available from Monsanto Chemical Co., USA. WEBNIX FREESIL N is available from Crusader Chemical Co., USA. NIPACIDE TK is available from Nipa Laboratories Ltd., Wales, United Kingdom. Pigments can be used in the practice of the present invention such as titanium oxide and color dispersions; TEGO 4710 is available from Goldschmidt AG, Germany. One useful curative is zinc diethyldithiocarbamate ("ZDEC"). Other useful commercial additives include ammonia, sodium lauryl sulfate, sodium dibenzyl sulfonate, and potassium hydroxide solution, that can be used as stabilizers.

Certain embodiments will now be further described in the following examples.

Percentages represent dry weight of a given component based on the total of an aqueous solution when water is listed in an example.

EXAMPLE 1

Cotton flock was dispersed into an aqueous solution using a high speed SILVERSON mixer model No. L4R. The following cotton flock dispersion was prepared:

| | |
|---|---|
| Sieved cotton flock | 1.0% |
| Ethoxylated acetylenic diol surfactant | 0.18% |
| Triethanolamine | 0.18% |
| Water | 98.64% |

The cotton flock was sieved before adding into the mixture of water and surfactant to ensure no agglomeration of flock before addition. A stable and uniform dispersion was achieved.

EXAMPLE 2

Cotton flock was dispersed into an aqueous solution as in Example 1. Again, a stable and uniform dispersion was achieved.

| | |
|---|---|
| Sieved cotton flock | 2.0% |
| Ethoxylated acetylenic diol surfactant | 0.18% |
| Triethanolamine | 0.18% |
| Water | 97.64% |

EXAMPLE 3

Cotton flock was dispersed into an aqueous solution as in Example 1.

| | |
|---|---|
| Sieved cotton flock | 5.0% |
| Ethoxylated acetylenic diol surfactant | 0.18% |
| Triethanolamine | 0.18% |
| Water | 94.64% |

After approximately 50% of the amount of sieved flock was already dispersed, further flock addition caused the flock in the dispersion to swell and caused flock agglomeration and destabilization.

EXAMPLE 4

Cotton flock was dispersed into an aqueous solution as in Example 1.

| | |
|---|---|
| Sieved cotton flock | 5.0% |
| Ethoxylated acetylenic diol surfactant | 0.72% |
| Triethanolamine | 0.72% |
| Water | 93.56% |

Flock agglomeration and destabilization were observed, as in Example 3.

EXAMPLE 5

Cotton flock was dispersed into an aqueous solution as in Example 2. Micronised high density polyethylene wax was added prior to adding the cotton flock.

| | |
|---|---|
| Sieved cotton flock | 2.0% |
| Micronised HDPE wax | 1.0% |
| Ethoxylated acetylenic diol surfactant | 0.40% |
| Triethanolamine | 0.40% |
| Water | 96.20% |

A stable dispersion was obtained with no sign of agglomeration on normal stirring.

EXAMPLE 6

Cotton flock was dispersed into an aqueous solution as in Example 5.

| | |
|---|---|
| Sieved cotton flock | 3.0% |
| Micronised HDPE wax | 1.0% |
| Ethoxylated acetylenic diol surfactant | 0.40% |
| Triethanolamine | 0.40% |
| Water | 95.20% |

All of the sieved flock was uniformly dispersed on mixing with normal stirring, and there was no agglomeration. A stable flock dispersion was obtained.

EXAMPLE 7

The salt-based coagulant was prepared by adding the components to water in the following order.

| | |
|---|---|
| Calcium nitrate | 15.0% |
| PEG 3350 | 0.5% |
| S 465 | 0.3% |
| CELLOSIZE | 0.2% |

-continued

| | |
|---|---|
| Ethyl lactate | 0.6% |
| Ethyl alcohol, denatured | 5.02% |
| Water | as required |

The coagulant mixture was stirred until foam collapsed.

EXAMPLE 8

The following carboxylated acrylonitrile-butadiene latex was prepared.

| | |
|---|---|
| PERBUNAN X1171 | 35.7% |
| COMPOSITE A345 | 1.78% |
| SCRIPSET 550 | 0.36% |
| WEBNIX FREESIL N | 0.22% |
| NIPACIDE TK | 0.21% |
| Titanium dioxide | 0.18% |
| Potassium hydroxide | to pH 9–9.5 |
| Water | as required |

EXAMPLE 9

A ceramic textured glove former was heated to 60–70° C. and then dipped into a coagulant bath heated to 40–50° C. as in Example 7. After drying the salt deposits on the former, the former was then dipped into a carboxylated acrylonitrile-butadiene latex dispersion as in Example 8. The formed was then placed in an oven for 60 seconds at 90° C. to dry up the latex gels. Then the former was dipped into the following composite dispersion. The polymer composite dispersion looks viscous and is saturated with flock. The flock dispersion was prepared as in Example 6, except that the polyurethane latex and small quantity of acrylonitrile-butadiene latex compound of Example 8 were added in with stirring.

| | |
|---|---|
| Example 8 latex compound | 6.66% |
| NEOREZ R-987 | 3.33% |
| Sieved cotton flock | 3.00% |
| Micronised HDPE wax | 1.00% |
| Surfactants | as in Example 6 |
| Water | as required |

A uniform coating was achieved on the elastomer gels and was dried for 120 seconds at 80–90° C. before it was leached with hot water for 4 minutes at 40–50° C. The glove was then curled for 40 minutes at 120° C. The finished glove was wet-stripped after post-leaching.

EXAMPLE 10

The procedure of Example 9 was repeated, except that the flock dispersion was prepared according to Example 5 and the composite dispersion was prepared as below.

| | |
|---|---|
| Example 8 latex compound | 5.00% |
| NEOREZ R-987 | 2.50% |
| Sieved cotton flock | 2.00% |
| Micronised HDPE wax | 1.00% |
| Surfactants | as in Example 5 |
| Water | as required |

The glove after donning for a period of 1 hour still feels comfortable and dry.

EXAMPLE 11

The procedure of Example 9 was repeated using the following composite dispersion:

| | |
|---|---|
| Example 8 | 5.00% |
| NEOREZ R-987 | 2.50% |
| Sieved cotton flock | 2.00% |
| Rayon flock | 2.00% |
| Micronised HDPE wax | 1.00% |
| Ethoxylated acetylenic diol surfactant | 0.40% |
| Triethanolamine | 0.40% |
| Water | as required |

The glove after donning for a period of 1 hour feels drier than Example 10.

EXAMPLE 12

The procedure of Example 9 was repeated using the following composite dispersion:

| | |
|---|---|
| NEOREZ R-987 | 10.0% |
| Sieved cotton flock | 2.00% |
| Rayon flock | 2.00% |
| Micronised HDPE wax | 0.80% |
| Ethoxylated acetylenic diol surfactant | 0.40% |
| Triethanolamine | 0.40% |
| Water | as required |

The applied coating was fibrous and smooth.

EXAMPLE 13

The procedure of Example 9 was repeated using the following composite dispersion:

| | |
|---|---|
| NEOREZ R-987 | 7.50% |
| Sieved cotton flock | 2.00% |
| Rayon flock | 1.00% |
| Micronised HDPE wax | 0.80% |
| Ethoxylated acetylenic diol surfactant | 0.40% |
| Triethanolamine | 0.40% |
| Water | as required |

The applied coating was fibrous and smooth.

EXAMPLE 14

The procedure of Example 9 was repeated using the following composite dispersion. The composite dispersion mix was thickened to increase the pickup during dipping. The thickener was added after all the other ingredients were already dispersed. The viscosity of the thickened composite dispersion (Brookfield model LVT, spindle #1 @ 60 rpm) was 70 cps.

| | |
|---|---|
| NEOREZ R-987 | 5.00% |
| ACRYSOL G 111 thickener | 0.10% |
| Sieved cotton flock | 2.00% |
| Rayon flock | 1.00% |
| Micronised HDPE wax | 0.80% |
| Ethoxylated acetylenic diol surfactant | 0.40% |
| Triethanolamine | 0.40% |
| Water | as required |

The glove is more comfortable than Example 11 when donning for a period of 1 hour.

EXAMPLE 15

The procedure of Example 14 was repeated using the following composite dispersion:

| | |
|---|---|
| NEOREZ R-987 | 3.50% |
| ACRYSOL G 111 thickener | 0.40% |
| Sieved cotton flock | 2.00% |
| Rayon flock | 1.00% |
| Micronised HDPE wax | 0.80% |
| Ethoxylated acetylenic diol surfactant | 0.40% |
| Triethanolamine | 0.40% |
| Water | as required |

This glove is comfortable to don for a period of 1 hour and the user's hand still feels dry after this period. However, the coated laminate is less fibrous than Example 14.

EXAMPLE 16

The procedure of Example 9 was repeated, except the elastomeric gel layer was dipped into a standard typical foam mix as per below, followed by brief drying of the gel for 5 minutes at 40° C. This step was then followed by a 5% calcium nitrate coagulant primer dip, a drying step, and finally dipping into the composite dispersion as in Examples 14 and 15.

| | |
|---|---|
| Carboxylated nitrile latex | 100 g |
| Ammonia | to pH 9.5 |
| EMULVIN W | 0.5 g |
| Sulfur | 0.5 g |
| ZnO | 3.0 g |
| ZDEC | 0.3 g |
| Titanium dioxide pigment | 1.0 g |
| TEGO 4710 | 0.2 g |
| ACRYSOL G 111 | 2.0 g |

The above latex was diluted with water (142.5 g), mechanically whisked to 30% above its original volume, and adjusted to an effective viscosity for dipping. A fibrous coated foamed lining oil the glove is easy and very comfortable to don and appeared to have an open-cell structure for better sweat absorption properties.

EXAMPLE 17

The following composite dispersion was prepared:

| | |
|---|---|
| Carboxylated nitrile latex | 82.5% |
| Sieved cotton flock | 10.0% |
| Rayon flock | 2.5% |
| Micronised HDPE wax | 0.8% |
| Sodium lauryl sulfate | 0.1% |
| CALSOFT L 60 | 1.0% |
| ACRYSOL G 111 thickener | 0.8% |
| Zinc oxide | 1.5% |
| Sulfur | 0.4% |
| ZDEC | 0.4% |

The above latex composite dispersion mix was diluted with water to 35% of its total solids, whipped with a cake mixer to approximately 20% above its original volume, and adjusted to a viscosity in the range of 1500–2000 cps for dipping. Then the procedure of Example 9 was repeated, except the elastomeric gel layer was dipped into the foamed composite mixture. When the first elastomeric gel layer was dipped into the foamed composite mix, a uniform foam gel was formed and the foam was allowed to partially dry at room temperature. The foam-coated elastomer gel was leached in warm water heated to 40–50° C. while maintaining the water flow rate in order to provide sufficient agitation to wash away or remove a thin layer of foam bubble on the surfaces of the composite foamed gel. A uniform fibrous structure interleaved with an open-cell structure matrix was formed as the former was removed from the leach water and upon curing for 40 minutes at 120° C., a fine porous foam composite laminate was formed on the glove. The glove is comfortable to don and leaves the user's hand still dry after wearing the gloves for a period of 1 hour.

The described invention may be varied in different ways. Therefore, it should now be apparent to a person skilled in the art that such variations may not be regarded as a deviation from the principles of the invention as described in the following claims.

What is claimed is:

1. An elastomeric article comprising:
   a first layer, the first layer comprising a natural or synthetic polymer;
   a second layer, the second layer comprising a foamed natural or synthetic polymer; and
   a third layer bonded to the second layer, the third layer comprising a polymer composite fibrous coating.

2. The elastomeric article of claim 1, wherein the polymer composite fibrous coating comprises at least one elastomer or elastomer blend, a fiber or fiber blend, a surfactant, and a micronised wax.

3. The elastomeric article of claim 2, wherein the polymer composite fibrous coating is foamed.

4. An elastomeric article comprising:
   a first layer, the first layer comprising a natural or synthetic polymer; and
   a second layer bonded to the first layer, the second layer comprising a polymer composite fibrous coating, the polymer composite fibrous coating comprising
   at least one elastomer,
   at least one fiber,
   an ethoxylated acetylenic diol, and
   a micronised wax.

5. The elastomeric article of claim 4, wherein the polymer composite fibrous coating further comprises triethanolamine.

6. An elastomeric article comprising:
   a first layer, the first layer comprising a natural or synthetic polymer; and
   a second layer bonded to the first layer, the second layer comprising a polymer composite fibrous coating, the polymer composite fibrous coating comprising
   at least one elastomer,
   at least one fiber,
   a surfactant,
   a micronised wax, and
   a foaming agent.

7. An elastomeric article comprising:
   a first layer, the first layer comprising a natural or synthetic polymer; and
   a second layer bonded to the first layer, the second layer comprising a foamed polymer composite fibrous coating, the foamed polymer composite fibrous coating comprising
   at least one elastomer,
   at least one fiber,
   a surfactant, and
   a micronised wax.

8. An elastomeric article comprising:
   a first layer, the first layer comprising a natural or synthetic polymer; and
   a second foamed layer, the second foamed layer comprising
   an elastomer in an amount ranging from about 2% to about 85%, based on the total weight of the second layer prior to curing,
   a fibrous material in an amount ranging on about 2% to about 15%, based on the total weight of the second layer prior to curing, and
   a micronised wax in an amount ranging from about 0.5% to about 2%, based on the total weight of the second layer prior to curing.

9. An elastomeric article comprising:
   a first layer, the first layer comprising a natural or synthetic polymer; and
   a second layer bonded to the first layer, the second layer having an outer surface, the second layer comprising a polymer composite fibrous coating, the polymer composite fibrous coating comprising
   at least one elastomer,
   a flock of fibers,
   a surfactant comprising ethoxylated acetylenic diol, and
   a micronised wax, wherein the fibers are dispersed throughout the second layer, and the fibers project from the outer surface of the second layer, for providing sweat management properties and non-shedding properties to the elastomeric article, wherein the article still feels dry after one hour.

10. An elastomeric article comprising:
    a first layer, the first layer comprising a natural or synthetic polymer; and
    a second foamed layer bonded to the first layer, the second layer having an outer surface, the second foamed layer comprising a polymer composite fibrous coating, the polymer composite fibrous coating comprising
    at least one elastomer,
    a flock of fibers,
    a foaming agent,
    a surfactant, and
    a micronised wax, wherein the fibers are dispersed throughout the second layer, and the fibers project from the outer surface of the second layer, for providing sweat management properties and non-shedding properties to the elastomeric article, wherein the article still feels dry after one hour.

\* \* \* \* \*